UNITED STATES PATENT OFFICE.

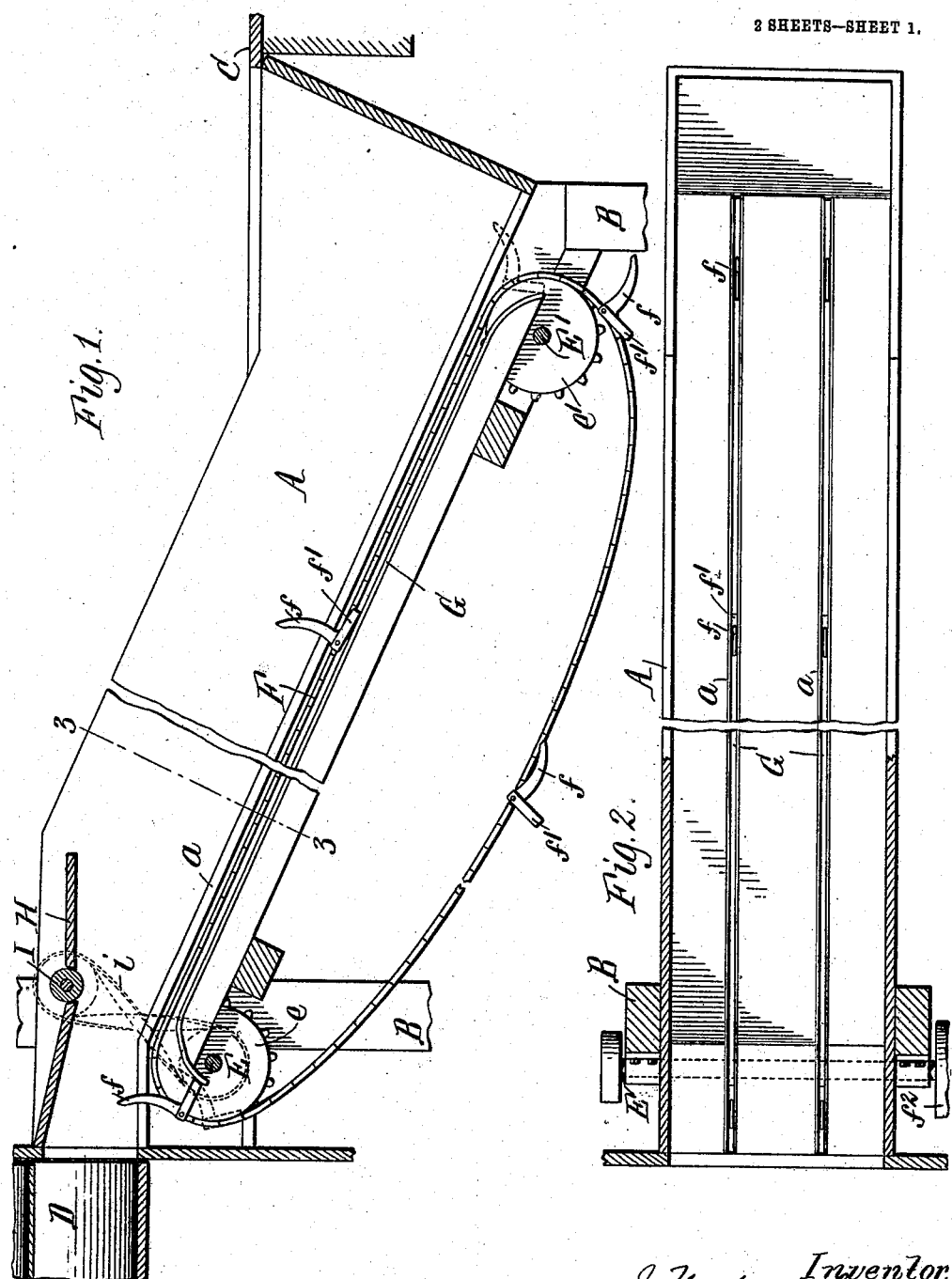

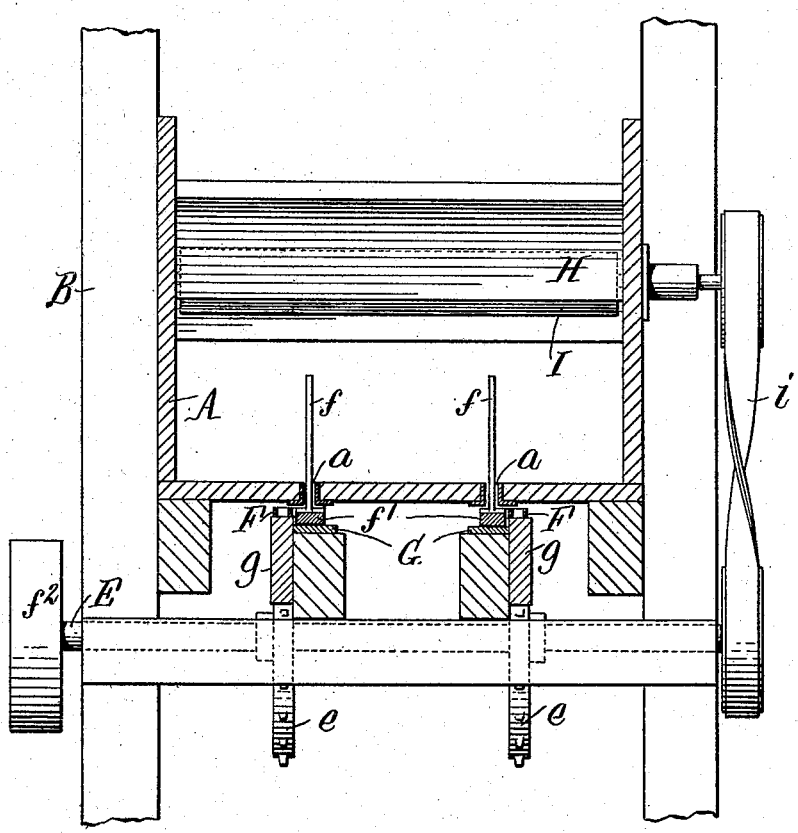

I NEWTON WHITE, OF MOUNT MORRIS, NEW YORK, ASSIGNOR OF ONE-HALF TO JOHN F. WHITE, OF MOUNT MORRIS, NEW YORK.

FEEDER FOR PEA-THRESHING MACHINES.

No. 908,053.　　　　Specification of Letters Patent.　　　Patented Dec. 29, 1908.

Application filed September 4, 1906. Serial No. 333,226.

*To all whom it may concern:*

Be it known that I, I NEWTON WHITE, a citizen of the United States, residing at Mount Morris, in the county of Livingston and State of New York, have invented a new and useful Improvement in Feeders for Pea-Threshing Machines, of which the following is a specification.

This invention relates to improvements in carriers or elevators for threshing machines and is especially adapted for use in connection with machines designed for threshing peas and commonly known as "pea vining machines", although its use is not necessarily confined to this class of machines.

The object of this invention is to provide a simple and efficient carrier into which the vines may be dumped directly from the wagon or readily thrown from the receiving floor and by which they are carried up and fed into the receiving cylinders of the threshing machine without requiring further handling or attention on the part of the operator. By this means a large saving of labor is obtained and a constant and uniform feed of vines to the machine is secured.

In the accompanying drawings: Figure 1 is a broken longitudinal sectional elevation of a feed conveyer embodying the invention. Fig. 2 is a plan view of the same, partly in section. Fig. 3 is a cross sectional elevation of the same, on an enlarged scale, in line 3—3, Fig. 1.

Like letters of reference refer to like parts in the several figures.

A represents a conveyer trough or box, B a supporting frame or structure for the same, C the floor or platform on which the vines are unloaded or from which they are dumped or thrown into the trough to be conveyed to the machine, and D the receiving cylinder of the vining or threshing machine. The trough or box A is open along its upper side throughout the greater portion of its length and its lower end is preferably located below the level of the receiving floor, so that the vines can be readily thrown or shoved from the receiving floor into the trough or can be dumped directly thereinto from a wagon on the floor or platform.

E E' represent shafts which are journaled in suitable bearings on the frame B and carry sprocket wheels $e$ $e'$. These shafts and wheels are arranged below the bottom of the trough A, with the sprocket wheels adjacent to longitudinal slots $a$ in this bottom which extend the entire length of the carrier. Chain belts F pass around these sprocket wheels and are pivoted at suitable intervals with carrying fingers or teeth $f$ which are pivoted to the links of the chain belts and are adapted to project from the upper runs of the chains up into the trough through the slots $a$ in the bottom thereof. The teeth are provided with rigid arms $f'$ extending at an angle therefrom, which are heavy enough to swing downwardly from the chains when free and thereby turn the teeth to a substantially horizontal position, see the teeth at the lower and end portions of the chains in Fig. 1.

Two carrier chains are provided in the feed conveyer illustrated, but one, two or more chains could be employed, as desired. The carrier chains can be driven in any suitable manner, for instance, the shaft for the upper sprocket wheels is provided with a belt pulley $f^2$ adapted to be belted to a driving wheel on the threshing machine.

G represents guide rails arranged below the bottom of the trough, one adjacent to the upper run of each carrier chain, in such a position that as the teeth pass upwardly with the chains over the sprocket wheels at the lower end of the conveyer their arms $f'$ will be engaged by these guides and the teeth will be turned to an upright position, in which position they will be retained while passing through the slots $a$ in the bottom of the trough until their arms pass off of the upper ends of the guide rails. The guide rails are somewhat shorter than the upper run of the carrier chains and their upper ends are curved downwardly, as shown in Fig. 1, so that the teeth will remain substantially upright as they move downwardly around the upper sprocket wheels and the teeth will therefore be withdrawn from the slots in the bottom of the trough in the direction of their length, until their arms $f'$ clear the upper ends of the guide rails, when the teeth will fall backwardly and downwardly from the trough. Thus the teeth will be withdrawn from the vines without becoming entangled therewith and tearing the vines or pulling them through the slots in the bottom of the trough. While the teeth are withdrawn vertically out of the trough, nevertheless they move forwardly until close to the cylinders of the threshing machine and push the vines well into the threshing machine.

The upper runs of the carrier chains are preferably held parallel with the bottom of the trough and prevented from sagging by rails $g$ upon which the upper runs of the chains rest and along which they slide.

The trough or chute A has at its upper end, adjacent to the threshing cylinder, a top or cover H which forms with the sides and bottom of the trough a closed throat or passage way leading to the threshing cylinders. This top or cover inclines downwardly for a part of its length from the upper end of the trough and then extends substantially horizontally so as to contract the throat somewhat between its ends. That is, the throat is smallest in diameter between its ends and flares or increases in diameter towards its ends.

The vines being carried up the conveyer are by these means compressed or compacted somewhat as they pass through this throat, and upon passing the contracted part of the throat they will expand slightly and will readily enter the threshing cylinders without clogging or choking the conveyer. To further facilitate the feeding of vines through this throat into the threshing machine, a roller I is provided extending across the throat adjacent to the top or cover and suitably journaled in bearings at the sides of the trough. This roller can be driven in a direction to coöperate with the carriers to feed the vines into the threshing machine by any suitable means, such as a crossed belt $i$ connecting belt wheels on the ends of the shaft of the roller and the shaft for the upper sprocket wheels. This revolving roller facilitates the movement of the vines through the throat and prevents their becoming wedged or clogged therein. The surface of this roller may be made rough or provided with teeth to increase its effectiveness, if desired.

By leaving the trough open throughout the greater portion of its length, the danger of the vines becoming clogged in the carrier is greatly lessened and the operator has ready access to the carrier, so that in case the vines should become clogged they can be easily removed. It further enables the operator to see at all times the manner in which the vines are passing through the throat of the conveyer and he can thus regulate the feed to the conveyer accordingly.

I claim as my invention:

1. The combination of an inclined trough, a cover for the upper portion thereof forming therewith at the upper end of said trough a passage-way having a contracted throat and an enlarged end portion, an endless carrier having projecting pivoted teeth adapted to traverse said trough and said passage-way, and means coöperating with said teeth for holding the same upright during their movement through said trough and said passage-way, substantially as set forth.

2. The combination of an inclined trough, a cover for the upper portion thereof forming therewith at the upper end of said trough a passage-way having a contracted throat and an enlarged end portion, an endless carrier having projecting pivoted teeth adapted to traverse said trough and said passage-way, and guides for said teeth adapted to hold the same in a substantially upright position while traversing said trough, said guides having curved upper ends adjacent to the upper end of said carrier which engage said teeth and hold the same in a substantially upright position while they are being withdrawn from said passage-way, substantially as set forth.

Witness my hand, this 27th day of August, 1906.

I NEWTON WHITE.

Witnesses:
JOHN E. PHILLIPS,
HENRY REMMEL.